Figure 1:
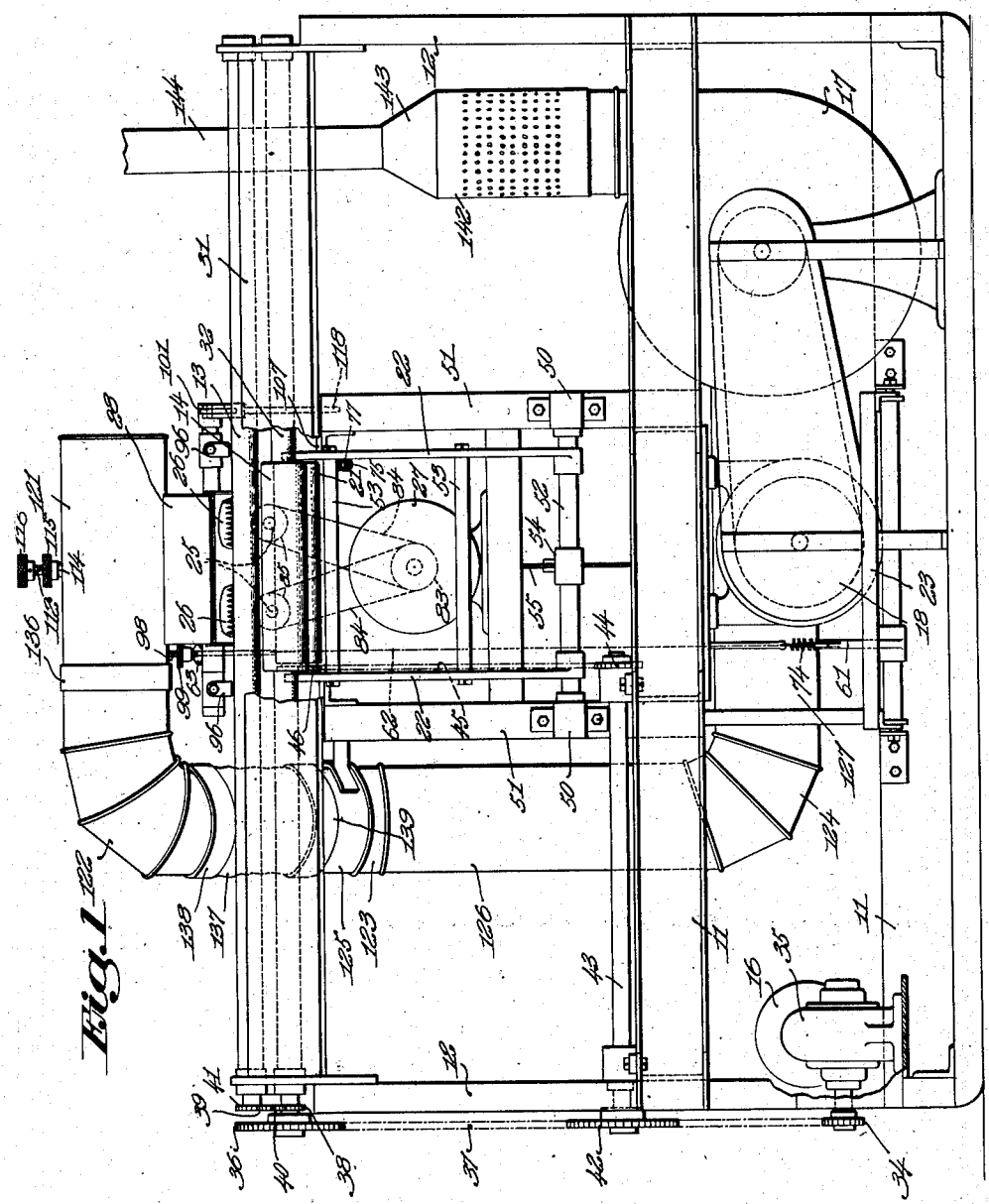

Oct. 23, 1945. R. L. GRIFFIN ET AL 2,387,579
SHEARING MACHINE
Filed March 11, 1943 5 Sheets-Sheet 2

Witness
Frederick S. Greenleaf

Inventors
Roger L. Griffin
Norman F. Moore
by their attorneys
Fish, Hildreth, Cary & Jenney Oct. 23, 1945.  R. L. GRIFFIN ET AL  2,387,579
SHEARING MACHINE
Filed March 11, 1943  5 Sheets-Sheet 4

Witness
Frederick S. Greenleaf

Inventors
Roger L. Griffin
Norman J. Noone
by their attorneys
Fish, Hildreth, Cary & Jenney

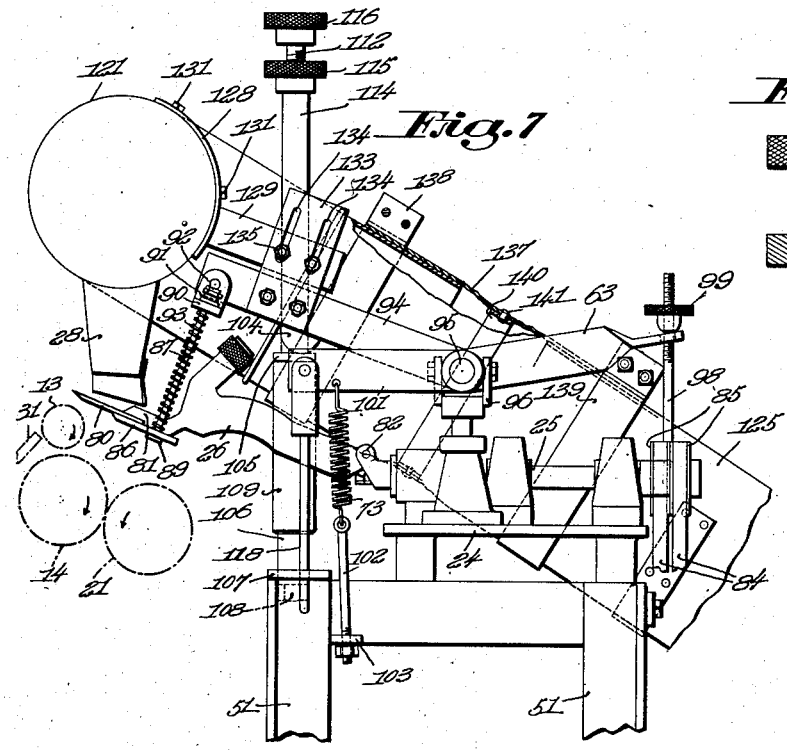

Patented Oct. 23, 1945

2,387,579

UNITED STATES PATENT OFFICE 2,387,579

SHEARING MACHINE

Roger L. Griffin, Marblehead, and Norman Y. Moore, Danvers, Mass., assignors to A. C. Lawrence Leather Company, Peabody, Mass., a corporation of Maine Application March 11, 1943, Serial No. 478,802

28 Claims. (Cl. 26—15)

The present invention relates to shearing machines and more particularly to that type of machine for shearing or clipping the fur of pelts, such as woolskins.

When long woolskins are to be processed, as for use in garments, it is the practice to shear or clip the wool to a uniform, predetermined length, and one of the objects of the present invention is to provide a machine which shall perform this operation in an expeditious and successful manner, without variation in the length of the wool or fur in different portions of the skin, or requiring undue skill or effort on the part of the operator.

Another object of the invention is to perform the clipping or shearing operation in such manner that each fibre shall be subjected to only a slight cut, thus producing a clip having maximum length of fibre and, therefore, of maximum value.

Still another object is to provide for a suction conveyor system for the clipped fibres including a hood adjacent the clipper or shearing instrumentalities and so adjustably supported as to cooperate with such devices and promote their most efficient operation.

A still further object is to provide supporting and feeding mechanism for the skins or pelts which shall present and feed the work in a more efficient and uniform manner, thereby improving the operation of the shearing devices and the quality of the product.

To these ends a feature of the present invention consists in the arrangement and operation of the shearing devices and the feeding mechanism to insure, on the one hand, the cessation of the shearing operation before the feed stops, and on the other hand, the initiation of the feed before the shearing begins, this being accomplished preferably by withdrawing the shearing devices from operative position while the feed is still operating, and starting the feed before the shearing devices are returned to operative position.

Another feature of the invention consists in mounting the hood of the conveyor system in normally fixed relation to the shearing devices and providing a suitable flexible connection in the conveyor duct between the hood and the fixed portions of such duct to permit movement of the shearing devices and hood as a unit into and out of shearing position. Also, to provide for adjustment of the hood both toward and from the clipping devices and angularly with respect thereto so that the clip will be properly withdrawn as it is severed from the skin.

Figure 2:
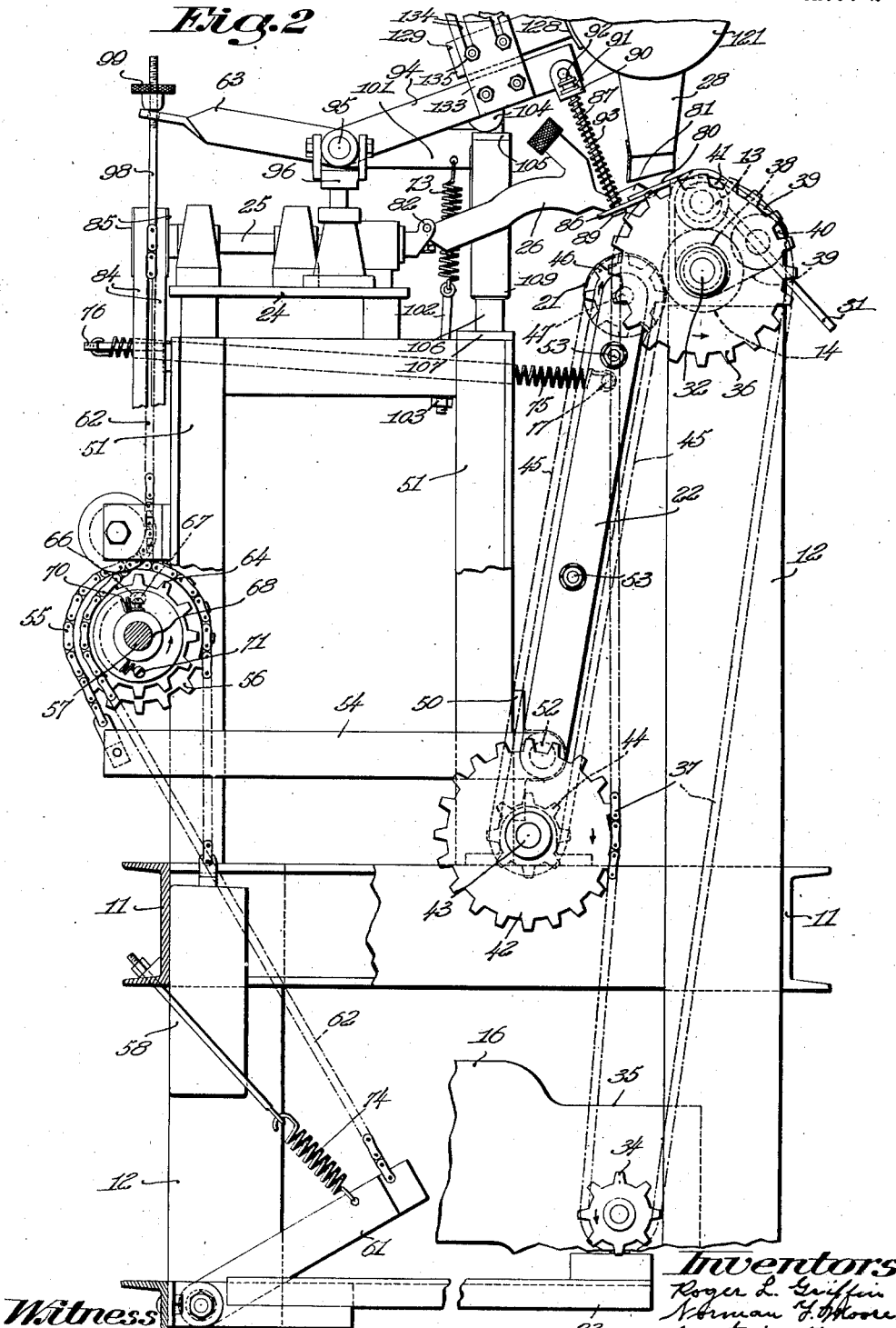
Figure 3:
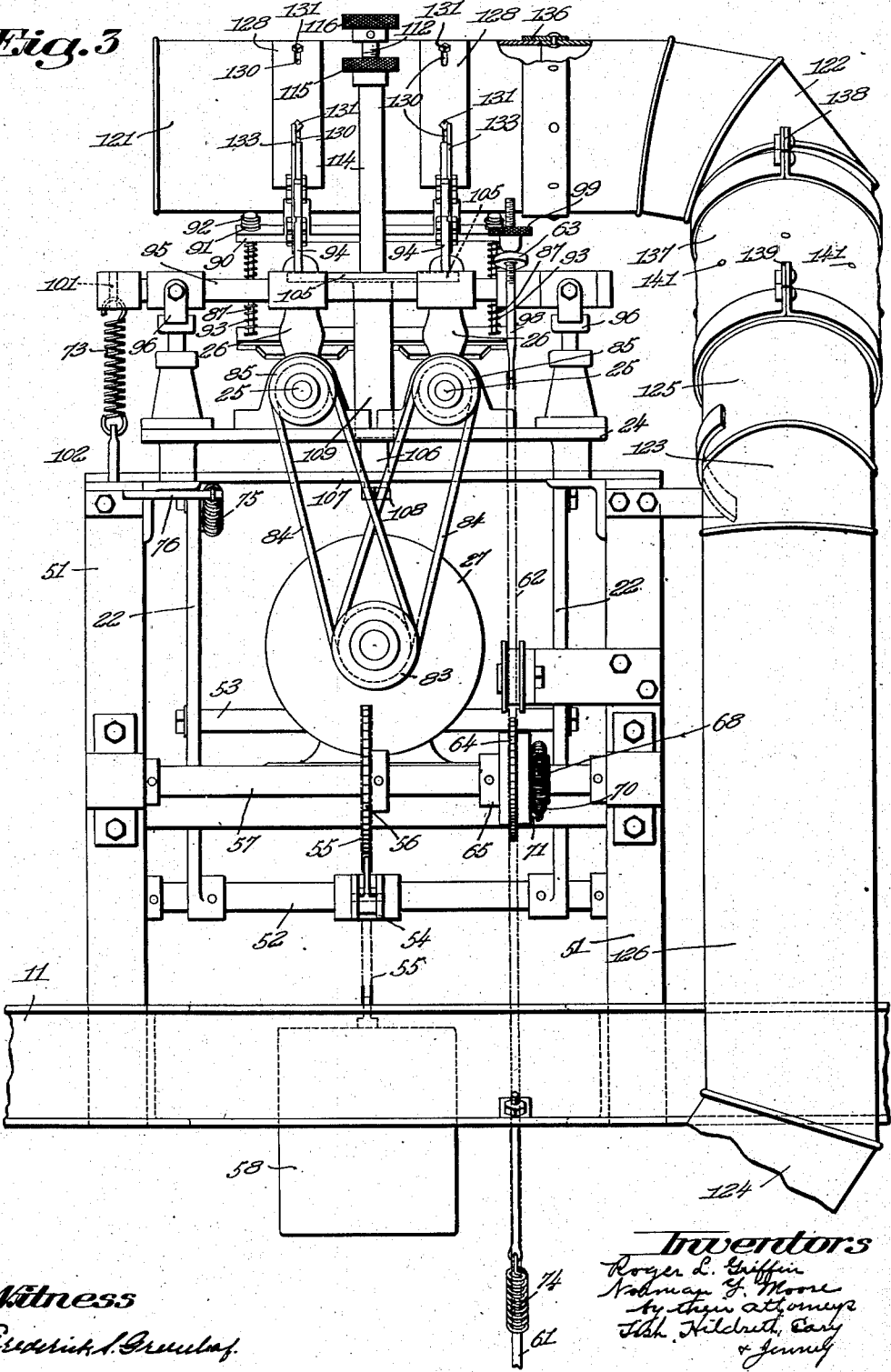
Figure 4:
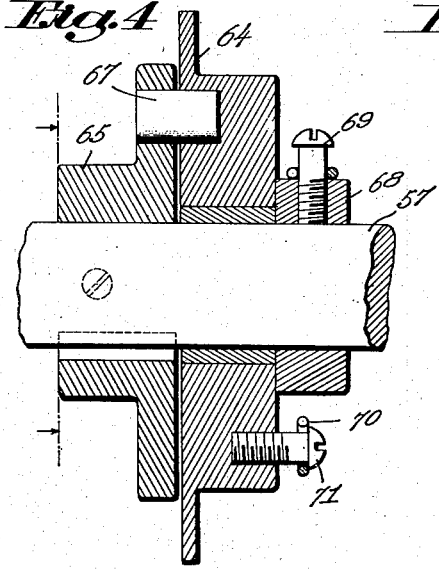
Figure 5:
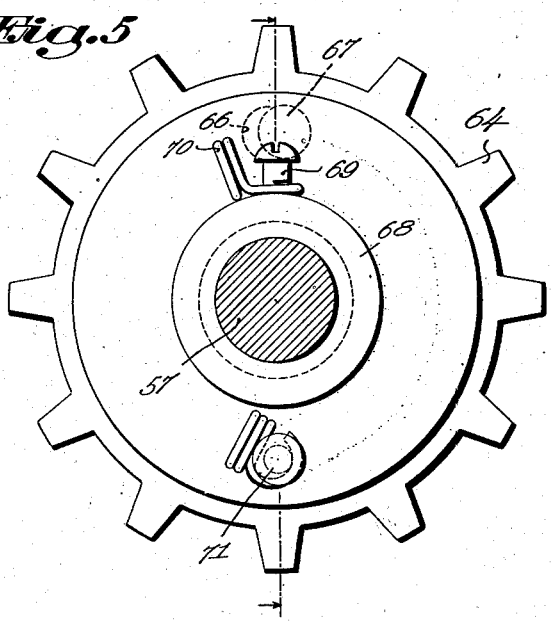
Figure 6:
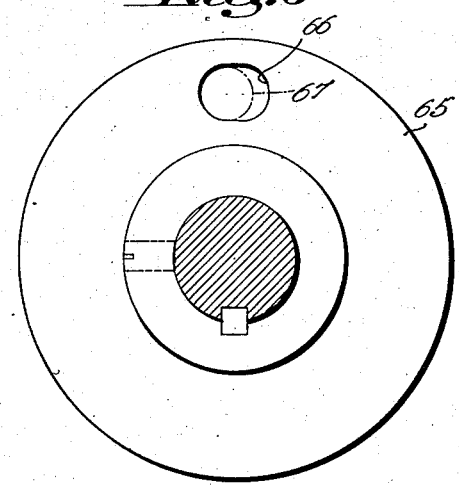

Other features of the invention will be obvious to those skilled in this art from the following specification and the accompanying drawings in which is illustrated a woolskin shearing machine embodying the present invention, and of which Fig. 1 is a front elevation; Fig. 2 is a side elevation looking from the left of Fig. 1 showing the drive for the skin supporting and feeding rolls, the treadle and connections for raising and lowering the cutters and hood, and the driving connections for the cutters; Fig. 3 is a rear elevation of the middle portion of the machine on an enlarged scale; Figs. 4, 5 and 6 are enlarged detail views of the lost motion, spring-loaded coupling whereby the cutters are rendered inoperative before the feeding mechanism is thrown out of action, and are not rendered operative until after such mechanism has begun its feeding action, Fig. 4 showing the assembled coupling in vertical axial section, Fig. 5 showing the same in side elevation, and Fig. 6 showing one member of the coupling separately in side elevation; Fig. 7 is a side elevation, looking from the right of Fig. 1, of the top portion of the machine with supporting and feed rolls shown diagrammatically in dot and dash outline; Fig. 8 is an enlarged detail, largely in vertical section, of the adjustable element of the mechanism for lifting the cutters and hood; and Fig. 9 is a top plan of the cutter lifting unit comprising the shaft and its actuating arm and the cutter and hood supporting arms fixed thereto.

In the machine of the drawings the skin to be sheared is fed over an upwardly inclined and rearwardly extending apron or table, then over a supporting roll, and finally downwardly between the lower feed roll and the pressure roll, all three rolls being power driven. At the line of flexure over the supporting roll a pair of shearing cutters cut or shear the excess wool from the skin, the clip being carried away through a suction hood connected by a conduit with the intake of a suction fan whence it is delivered to a suitable container, such as a textile bag. The shearing devices, suction hood and swinging pressure roll are all mounted upon pivoted arms, which are actuated by the single treadle which, when depressed, first raises the cutter devices and hood into inoperative position and then swings the pressure roll away from the feed roll to stop the feed of the skin. When the treadle is released, the pressure roll engages the skin to render the feed roll operative and start the skin in motion, and thereafter the cutters and hood are lowered into the shearing or cutting position. Separate motors are provided, one for actuating the shearing devices, another for driving the suction fan, and a third for rotating the supporting, feed, and pressure rolls.

As shown in Fig. 1, the frame of the machine comprises suitable horizontal members 11 and vertical members 12, preferably of angle or channel iron construction, bolted, welded, or riveted together. Pivotally mounted in fixed position at the top of the main frame are the supporting roll 13 and feed roll 14; while at the bottom is located their driving motor 16, and also the suction fan 17 and its motor 18. A pressure roll 21, also driven by motor 16, is rotatably mounted in the upper ends of the swinging arms 22 pivoted at their lower ends and controlled by treadle 23, and acts, when swung toward the feed roll, to press the skin against the same to feed the work, and when swung away, to relieve the pressure and stop the feed.

In the middle of the frame and at the back thereof is mounted a smaller or sub-frame 24 carrying the driving shafts 25 for a pair of shearing devices or cutters 26 driven from the motor 27. Also mounted upon the sub-frame 24 is the unit shown in Fig. 9 for supporting and lifting the cutters and the suction hood 28.

While the skins may, if the operator so desires, be placed directly upon and over the supporting roll 13, the proper presentation of the work to such roll and to the shearing devices is facilitated by the use of the apron or table 31 which is upwardly and rearwardly inclined at an angle of approximately 45°, see Figs. 1 and 2. Such an arrangement gives the operator a clear, perpendicular view of the work, thus enabling him to present and manipulate the skin to the best advantage. This feature is of importance since the cutters on each passage of the skin cut two relatively narrow, spaced strips or swaths, and it is necessary to pass the same skin repeatedly through the machine and to position it accurately for each pass.

In order to insure a uniform length or depth of fibres after shearing, it is necessary that the skin be flexed and stretched so that it is tight and rigid at the cutting point. The proper flexing is secured by the use of a supporting roll of relatively small diameter, while the stretching is accomplished by imparting a greater linear or surface speed to the feed and pressure rolls 14 and 21 than to the supporting roll 13, which acts as a drag or brake on the skin. In the machine of the drawings this difference in linear speed is secured by making the relatively short pressure roll and the operative portion of the long feed roll of greater diameter than the supporting roll, and operating all three rolls at the same rotational speed. Figs. 2 and 7 show in broken lines the relative diameters of these three rolls adjacent the cutters, the more distant portions of the feed roll being of reduced diameter, as shown at 32 in Fig. 1.

The means for driving the supporting and the feed rolls from the motor 16 comprise a driving sprocket 34 connected with the motor through a speed reduction gear box 35, the driven sprocket 36 upon the end of the feed roll 32, and the driving chain 37 between the sprockets. See Fig. 2. The supporting roll is driven from the small sprocket 38 on the feed roll shaft through the chain 39 which passes around the idler sprocket 40 and the sprocket 41 fixed upon supporting roll 13. See also Fig. 1.

The pressure roll 21 is also driven by the motor 16 through the driving chain 37 which engages the sprocket 42 on the outer end of the shaft 43, sprocket 44 on the inner end of the shaft, chain 45, and sprocket 46 fixed upon the pressure roll shaft 47. See Figs. 1 and 2.

The feeding of the skins past the clippers is controlled through the pressure roll which is arranged to be moved toward and from the feed roll to render these two rolls operative and inoperative with respect to their feeding function. This is accomplished as follows: Pivoted in the bearings 50 on the vertical members 51 of the frame of the machine is the horizontal shaft 52 carrying fixed thereon adjacent its ends the arms 22 which rotatably support at their upper ends the pressure roll 21. These arms are connected by the cross-members 53. Fixed upon the middle of the shaft 52 is the actuating arm 54, adapted to be raised and lowered at its outer end by means of chain 55 passing around the sprocket 56 fixed upon the horizontal treadle shaft 57 and carrying the weight 58. The treadle shaft is arranged to be actuated in one direction by the operator to withdraw the pressure roll from the feed roll by the depression of the treadle 23 and suitable connections, and in the opposite direction to cause the pressure roll to approach the feed roll by the weight 58 when the treadle is released.

The treadle 23 also serves to control the raising and lowering of the cutters from and to operative position, the arrangement being such that while movement of the cutters occurs simultaneously with the movement of the treadle, there is a delay in the initiation of movement of the pressure roll away from the feed roll in order to insure the continuation of the feeding of the skin until the cutters have been moved out of cutting position. Also, when the treadle is released, the pressure roll starts the feed before the cutters reach their lowermost or cutting position.

The construction for securing this result is as follows. Connected to the treadle arm 61 is the treadle chain 62 attached at its upper end to the actuating lever 63 of the clipper lifting mechanism, and midway its ends passing around the sprocket 64, mounted for limited rotational movement upon the shaft 57. Adjacent the sprocket is a flanged member 65 secured to the shaft and having formed therein the elongated slot 66 to receive the stud 67 fixed in the sprocket 64. See Figs. 4, 5 and 6. A collar 68 mounted upon the treadle shaft 57 on the opposite side of the sprocket 64 from the flanged member 65 is fixed on the shaft by the set screw 69, to which is attached one end of tension spring 70, the other end being connected to the screw 71 in the sprocket.

The tension spring normally tends to turn the sprocket 64 on the shaft in a clockwise direction, as shown in Fig. 5, bringing the stud 67 to the end of the slot 66 as shown in broken line in Fig. 6. When the treadle is depressed, the treadle chain will first rotate only the treadle sprocket 64 in the direction of the arrow, Fig. 2, the treadle shaft and sprocket remaining stationary, thus giving an initial lifting movement to the cutters while the feed continues in operation. After the pin 67 has traveled the length of the slot 66 and engaged the end thereof, the treadle shaft is also set in operation and the pressure roll begins to move away from the feed roll as the cutters continue their rising movement.

When the treadle is released, both sprockets 64 and 56 begin to rotate in the direction opposite to the arrow, and both cutters and pressure roll start at the same time to move from their inoperative to their operative positions. These movements continue and the pin 67 remains at the end of the slot to which it had moved until the pressure roll reaches full operative position, when it stops. The cutters, however, have not yet reached their cutting position, but as the treadle sprocket continues its rotation assisted by the spring 70, the pin 67 passes along the slot and back to its original position, during which time the cutters complete their movement and come to their final operative position.

The upward movement of the treadle chain 62, when the treadle 23 is released to bring the cutters and pressure roll to their operative positions, is produced by the combined action of the weight 58 and the spring 74, the former forcing the pressure roll toward the feed roll, and the latter supplementing the weight of the cutters and hood in carrying these parts down from their raised positions. The treadle spring 74 also assists by relieving the chain to a large degree of the weight of the treadle 23.

To insure the withdrawal of the pressure roll from the feed roll when the treadle is depressed and weight 58 lifted, spring 75 has been provided, attached at one end to the arm 76 fixed to the frame of the machine and at the other end to the pin 77 extending inwardly from one of the pivoted arms 22 supporting the pressure roll 21.

The shearing devices consist of a pair of cutters 26 or shearing heads, as they are commonly called, those illustrated in the drawings being of a standard and well known construction, comprising a lower fixed comb 80 and the upper oscillating toothed cutter 81. The cutters are driven from cutter shafts 25 through universal joints 82 to permit the cutting instrumentalities to be raised or lowered to vary the depth of cut, or to raise the devices entirely out of operative relation to the skin. The cutter shafts are driven from the motor 27 through the motor pulleys 83, V-belts 84 and cutter shaft pulleys 85, as shown in Fig. 3.

The rear end of each cutter head is supported by its universal joint 82 while its front or cutting end has its comb secured to and supported by the plate 86 extending beneath both heads. See Figs. 3 and 7. This plate is supported upon rods 87, the lower ends passing through the plate and carrying a nut 89 threaded thereon. The upper ends pass through a supporting bar 90, and each end has a bushing 91 through which the rod loosely passes and adjusting rod 92. A compression spring 93 surrounds each rod and maintains the front end of the cutting head yieldingly in position.

The supporting bar 90 is secured to the front ends of the supporting arms or levers 94 upon the rock-shaft 95 pivoted in bearings 96 on the sub-frame 24. See Figs. 2, 3 and 7. Fixed upon the rock-shaft and extending rearwardly therefrom is the actuating lever 63 through the end of which passes the rod 98, the lower end of which is attached to the treadle chain 62. See Fig. 2. A knurled nut 99 on the threaded upper end provides an adjustable abutment for the end of the actuating lever 63.

Secured upon the end of the rock-shaft 95 is the spring arm 101 to the outer end of which is attached the extension spring 73 anchored through the bar 102 to the frame of the machine at 103. This spring, as already pointed out, supplements the weight of the parts and tends normally to depress the cutters and hold them in their lowermost or operative position.

In order to vary the operative position of the cutters and, therefore, the length of the fibre left upon the skin after the shearing, stops have been provided in the form of half-round projections 104 on the bottoms of the supporting arms 94, see Figs. 2 and 7, which engage an adjustable abutment plate 105 extending horizontally across the front of the machine beneath the arms. This plate is shown in enlarged detail in Fig. 8 together with its supporting and adjusting devices.

The plate is vertically adjustable upon its tubular support 106 held in fixed position in one of the cross-members 107 of the frame by means of the bolt 108 passing through a hole in the frame, and screwed into the threaded bore at the lower end of the support. Vertically adjustable upon this support is the plate 105, with its depending tubular extension 109 fitting loosely over the support 106 and held from rotation thereon by the spline 110 carried by the extension and vertically movable in the groove 111 on the support.

Received within the threaded upper end of the bore in the support 106 is the threaded adjusting rod 112 which passes loosely through the plate 105, with the nut 113 pinned upon the rod engaging and supporting the plate. Above the plate and surrounding the rod is the tube 114 which is normally clamped against the plate by means of the knurled nut 115 on the upper threaded portion of the rod. Fixed upon the extreme end of the rod is the knurled collar 116 for rotating the rod to raise or lower the plate 105 as may be desired, to adjust the operative position of the cutters with respect to the skin. When the plate has once been adjusted it is locked in position by tightening the nut 115 to clamp the plate fixedly between the tube 114 and the nut 113.

While the plate is being adjusted, the knurled nut 99 on the rod 98 at the upper end of the treadle chain 62 will be loosened, being subsequently tightened into light contact with the end of the actuating lever 63 to insure the proper and immediate lifting of the cutters when the treadle chain starts its downward movement upon depression of the treadle.

To hold the cutters in raised or inoperative position without requiring continuous depression of the treadle, a holding pin 118 has been provided, pivoted to the front end of the spring lever 101 and passing freely through an opening in the horizontal member 107 of the frame. See Fig. 7. The pin is of such length that in ordinary operation of the machine it is still retained within the hole in the frame even when the cutters are lifted by depression of the treadle. If, however, for any reason it is desired to hold the cutters raised without the use of the treadle, they will be lifted by hand sufficiently to free the end of the pin from the hole in the frame, permitting it to be swung slightly upon its pivotal support and then lowered in engagement with the frame member 107, thus holding the parts raised. As such time the rear end of actuating lever swings downwardly upon rod 98 and away from knurled nut 99.

The hood 28 of the wool collector and conveyor system extends downwardly from the horizontal section 121 of the conveyor pipe which, through suitable connecting sections, including elbows or bends 122, 123, and 124, inclined section 125, vertical section 126, and horizontal section 127, is connected with the intake of the suction fan 17. The proper positioning of the hood with respect to the shearing heads is of great importance in order that the wool or fibres may be lifted and straightened by the suction and presented to the cutters at the proper angle for their most efficient and accurate operation. Furthermore, it is desirable that the clipped wool be drawn into the hood as soon as it is cut off so that none escapes into the room or remains on the cutter heads. Accordingly, the conveyor section 121 from which the hood depends is so supported that the hood may be adjusted both angularly and also vertically with respect to the shearing heads. The angular adjustment is secured by means of the arc-shaped members 128 on the ends of the hood supporting arms 129, these members being provided with slots 130 through which pass the securing bolts 131 screwed into the threaded opening in the wall of the section. When the bolts are loosened, the section may be rotated in the members, thereby angularly adjusting the hood 28 with respect to the cutters, after which the bolts are tightened to hold the parts in adjusted position.

The supporting arms 129 are mounted upon vertical brackets 133 bolted upon the shearing head supporting arms 94, and permit the hood and conveyor section 121 to be raised or lowered with respect to the shearing heads by means of the elongated slots 134 through which pass the clamping bolts 135. By first loosening these bolts the supporting arms 129 may be raised or lowered, as desired, to adjust the head vertically with respect to the shearing heads. Angular rotation of the hood carrying section 121 is permitted by the slip joint 136, in the horizontal portion of the conveyor, see Fig. 3, and bodily movement of the section 121 by means of a flexible joint in the inclined section 125. This joint, as shown in Fig. 7, is formed of a tubular section of leather 137 secured at its upper and lower ends by the circular clamps 138 and 139, with its middle portion held from collapsing under suction by the internal flat ring 140 secured in position by the rivets 141. The yielding connection also becomes operative as the hood is raised and lowered with the cutters as the latter are moved out of and into shearing position.

Where a single machine is used, it is the common practice to collect the clipped wool in a large porous bag through suitable piping extending from the discharge or outlet of the fan. Where, however, a number or series of these machines are used, it is the practice to connect the outlets or discharge openings of the several suction fans into a common duct of a conveyor system with its main suction or conveyor fan, so that the clipped wool from the several machines will be discharged and collected at a single point. For the proper raising and straightening of the fibres for the cutters and the collecting of the clipped wool, it is necessary to handle relatively large amounts of air, thereby requiring large pipes and fans. To discharge all of this air into a common duct of a conveyor system and to handle it by a main conveyor fan or fans would require large and expensive equipment with correspondingly high cost for installation, maintenance and operation.

It has been found that much less air is required for the conveying of fibres than for straightening and collecting them, and accordingly it has been arranged to eliminate a very large proportion of the air from the conveyor before it enters the common duct of the conveyor system. This is accomplished by providing a section for the conveyor pipe adjacent the outlet of the fan with a number of perforations through which air can escape from the pipe into the atmosphere. The perforated section is connected by means of an imperforate cone with the main conveyor piping of much less diameter, but which still, nevertheless, is large enough and has sufficient volume and velocity of air to convey the wool properly through the system.

In practice, it has been found that where a six inch pipe is used between the suction fan and the hood, a four inch pipe in the conveyor piping beyond the fan is large enough. The openings in the perforated section may be one-eighth of an inch in diameter, and are of a sufficient number in a two and one-half foot section to permit the escape of substantially one-half the air handled by the suction fan mounted on the machine. Such a perforated section is shown in Fig. 1 of the drawings at 142, with its reduction cone 143 and smaller size conveyor pipe 144.

Not only is such an arrangement much less expensive to install and operate, owing to the smaller piping, fan, and motor required, but the efficiency of the conveyor system as a whole is much higher, inasmuch as the shutting down of one or more of the shearing machines, with their individual fans, has much less effect upon the operating characteristics of the conveyor system.

The operation of the improved shearing machine is as follows: Assuming the instrumentalities are all in the proper adjustment and the several motors in operation, the operator places the skin about to be sheared upon the inclined apron or table with the middle of the skin opposite the cutters and the sides extended laterally on the apron. He then depresses the treadle to raise the cutters into inoperative position and move the pressure roll away from the feed roll, the cutters and the supporting, feed, and pressure rolls all being continuously driven during such time. The skin is now advanced by hand over the supporting roll until its advancing edge reaches the feed roll, when the treadle is released, bringing the pressure roll against the skin to start the regular feed under power. Immediately afterwards the cutters reach their lowermost or operative position and begin the cutting of two parallel, spaced strips or swaths along the skin.

As the rear edge of the skin approaches the cutters, the operator seizes a skin from beneath, and as soon as the edge of the skin passes the cutters he again depresses the treadle and then replaces the skin upon the apron as before, but so positioned laterally that one of the cutters will complete the trimming of the fibres between the two strips or swaths already cut, while the other will cut to one side of a previously cut swath. The skin is again advanced by hand until the front edge reaches the feed roll, when the treadle is released and the trimming operation takes place as before.

After repeated passages through the machine when the skin will have been trimmed across its entire width, the skin is turned end for end and the operation repeated to shear what was originally the front portion of the skin but which had not been previously trimmed because of the necessity of advancing such portion beneath the raised and inoperative cutters until a position between the feed and pressure rolls was reached and the power feed became operative.

It will be noted that by the use of a supporting roll of small diameter and a suction hood, the skin is flexed sharply at the shearing line with the fibres lifted and straightened. Since these fibres are subjected to a single cutting operation, their surplus length is preserved and they are drawn up into the hood in a continuous ribbon or bat, whence they are carried through the conveyor piping to the desired point of discharge.

By employing positively driven feed and pressure rolls upon opposite sides of the work, an even and uniform movement of the skin past the cutters is insured, thus avoiding any liability of thin or bald spots from the slowing down or stopping of the feed of the skin. Furthermore, the driving of the feed and pressure rolls at higher peripheral or lineal speed than the supporting roll acts to draw the skin over the surface of the latter, which thus applies a drag to the skin to maintain the latter tightly stretched at the line of shearing.

The operation of the cutter head or cutters to trim the fur uniformly to the desired length is greatly facilitated by the use of the small diameter supporting roll which bends or flexes the skin sharply at the shearing line to give free access of the cutters to the fibres as they are held raised and straightened by the action of the closely adjacent hood.

It will be noted that by controlling the movements of the shearing heads and the pressure roll into and out of operative position so that the cutters leave the skin before the feed stops and do not again contact it until the feed has been started, there is no danger of the operator damaging the skin by permitting the cutters to continue to operate upon the skin after the feed has stopped and the skin is stationary.

While the embodiment of the invention is shown in the accompanying drawings with a plurality of cutters, it is to be understood that the invention is not limited thereto nor to any of the other specific forms and arrangements of parts except where so set forth in the appended claims, but may be embodied in many other constructions and arrangements within the terms and scope of such claims.

Having thus described the invention, what is claimed is:

1. In a shearing machine, the combination with a supporting roll over which the skin to be sheared is flexed, of a shearing device operating adjacent the supporting roll for trimming the fur of the flexed skin, a feed roll beyond the shearing device in the direction of feed, an adjacent pressure roll for pressing the trimmed skin against the feed roll, and means for positively rotating said rolls in a direction to feed the work past the shearing device.

2. In a shearing machine, the combination with a supporting roll over which the skin to be sheared is flexed, of a shearing device operating adjacent the supporting roll for trimming the fur of the flexed skin, a feed roll beyond the shearing device in the direction of feed, a pressure roll for pressing the trimmed skin against the feed roll, and means for positively rotating said rolls in a direction to feed the work past the shearing device, the feed roll having a higher peripheral speed than the supporting roll to stretch the skin for the shearing operation.

3. In a shearing machine, the combination with a supporting roll over which the skin to be sheared is flexed, of a shearing device operating adjacent the supporting roll for trimming the fur of the flexed skin, a feed roll beyond the shearing device in the direction of feed, a pressure roll for pressing the trimmed skin against the feed roll, and means for positively rotating said rolls in a direction to feed the work past the shearing device, the feed and pressure rolls being of larger diameter than the supporting roll to insure the uniform feed of the work while permitting sharp flexing of the skin at the point of operation of the shearing device.

4. In a shearing machine, the combination with a supporting roll of substantially greater length than the width of the skin to be sheared over which the skin is flexed, of a shearing device adjacent the supporting roll, a feed roll beyond the shearing device in the direction of feed, the middle portion of the feed roll opposite the shearing device being of substantially greater diameter than its end portions and than the supporting roll, a pressure roll for pressing the skin against the feed roll, and means for positively rotating the supporting, feed, and pressure rolls at substantially the same rotational speeds.

5. In a shearing machine, the combination with a shearing device, of supporting, feed and pressure rolls, a motor for driving the same, a sprocket and chain connections from the motor to the feed roll, driving connections between the feed and the supporting rolls, a supplementary sprocket positioned to engage one leg of the feed roll driving chain, and sprocket and chain connections for driving the pressure roll from the supplementary sprocket.

6. In a shearing machine, the combination with a shearing device, of feeding mechanism for feeding the skin to be sheared past the shearing device, and control means under the control of the operator for throwing said device and mechanism into and out of operation, said control means being constructed and arranged when actuated by the operator to throw the feeding mechanism into operation before the shearing device, and to throw the shearing device out of operation before the feeding mechanism.

7. In a shearing machine, the combination with a shearing device adapted to be moved into and out of operative position, of feeding means for feeding the skin to be sheared past the shearing device, said means comprising a feed roll and a pressure roll, the pressure roll being movable toward and from the feed roll to throw the feeding means into and out of operation, a treadle, and operative connections from the treadle to the shearing device and to the pressure roll, said connections operative to move the shearing device into operative position only after the feeding means have begun operating, and to move the shearing device out of operative position before the feeding means cease operating.

8. In a shearing machine, the combination with a shearing device adapted to be lowered and raised to and from operative position, of feeding means for feeding the skin to be sheared past the shearing device, said means comprising a feed roll, a pressure roll, the pressure roll being movable toward and from the feed roll to throw the feeding means into and out of operation, a treadle, and operative connections from the treadle to the shearing device and to the pressure roll, said connections operating when the treadle is actuated in one direction to lower the shearing device into operative position only after the feeding means have begun operating, and when the treadle is actuated in the opposite direction to raise the shearing device into inoperative position before the feeding means cease operating, said connections including a spring-loaded lost-motion connection.

9. In a shearing machine, the combination with a cutter and means for actuating the same including a universal joint, of means for supporting the cutter in operative position, said means having provision for the yielding of the cutter with respect to the work about the universal joint.

10. In a shearing machine, the combination with a pair of spaced cutters, of means for actuating the same comprising a pair of actuating shafts mounted in fixed bearings, connections including a universal joint between each shaft and its driven cutter, means for supporting the cutters including a single rock-shaft, and mechanism for actuating the rock-shaft to raise and lower the cutters.

11. In a shearing machine, the combination with a suction hood of a cutter positioned adjacent the suction hood and outside the same, a pivoted arm for supporting the cutter and hood, and mechanism under the control of the operator for actuating the pivoted arm to raise and lower together the cutter and hood.

12. In a shearing machine, the combination with a cutter and means for actuating the same, of a suction hood adjacent the cutter, and common means for supporting the cutter and hood, said means having provision for yielding of the cutter with respect to the work and to the hood.

13. In a shearing machine, the combination with a cutter and means for actuating the same, of a suction hood positioned adjacent the cutter, and means for supporting the hood having provision for adjusting it bodily toward and from the cutter and angularly with respect thereto, in the line of feed.

14. In a shearing machine, the combination with a cutter and means for actuating the same, of a conveyor pipe, a portion being provided with a hood adjacent the cutter, and means for supporting said portion having provision for the angular adjustment thereof with respect to the adjacent section of the pipe comprising a rotary slip-joint between such portion and section.

15. In a shearing machine, the combination with a cutter and means for actuating the same, of a conveyor pipe, one portion being provided with a hood adjacent the cutter, means for supporting said portion having provision for the movement thereof to vary the position of the hood with respect to the work, and a flexible connection between such portion and the adjacent pipe.

16. In a shearing machine, the combination with a cutter and means for actuating the same, of a conveyor pipe, one portion being provided with a hood adjacent the cutter, means for supporting said portion having provision for the movement thereof to vary the position of the hood with respect to the work, a flexible connection between such portion and the adjacent pipe, such connection comprising a tubular section of flexible material attached to the adjacent spaced ends of the conveyor pipe, and a ring of rigid material secured to said flexible section between the ends of the pipe to hold the section distended.

17. In a shearing machine, the combination with a supporting roll over which the skin to be sheared is flexed, of a shearing device operating adjacent the supporting roll for trimming the fur of the flexed skin, a feed roll beyond the shearing device in the direction of feed, a pressure roll for pressing the trimmed skin against the feed roll, and means for positively rotating said rolls all at the same rotational speed and in a direction to feed the work past the shearing device, the feed and pressure rolls being of a larger diameter than the supporting roll to stretch the skin for the shearing operation.

18. In a shearing machine, the combination with a shearing device, of supporting, feed and pressure rolls, a motor for driving the same, a sprocket and chain connections from the motor to the feed roll, driving connections between the feed and the supporting rolls, a supplementary sprocket mounted to rotate upon a fixed axis and positioned to engage one leg of the feed roll driving chain, an arm pivoted at one end upon a fixed axis adjacent the axis of the supplementary sprocket, a pressure roll pivotally mounted in the other end of the arm, driving connections including a pressure roll sprocket and a supplementary chain between the supplementary sprocket and the pressure roll sprocket, and means under control of the operator for moving the pivoted arm to carry the pressure roll toward or away from the feed roll.

19. In a shearing machine, the combination with a shearing device of feeding means for feeding the skin to be sheared past the shearing device, said means comprising a feed roll and a pressure roll, the pressure roll being movable toward and from the feed roll to throw the feeding means into and out of operation, a treadle, yielding means tending to move the pressure roll toward the feed roll, less effective yielding means tending to move the pressure roll away from the feed roll, and connections between the treadle and the first mentioned means to render the same inoperative.

20. In a shearing machine, the combination with a shearing device of feeding means for feeding the skin to be sheared past the shearing device, said means comprising a feed roll and a pressure roll, the pressure roll being movable toward and from the feed roll to throw the feeding means into and out of operation, a weight for pressing the pressure roll toward the feed roll, a spring tending ineffectively to move the pressure roll away from the feed roll against the action of the weight, and a treadle for rendering the weight inoperative whereby the pressure roll is moved by the spring away from the feed roll.

21. In a shearing machine, the combination with a cutter and means for actuating the same, of a conveyor pipe, one portion being provided with a hood adjacent the cutter, a pivoted lever for supporting the conveyor pipe and hood, and connections between the pipe and the lever comprising a bracket curved at one end to fit around the conveyor pipe and secured thereto by bolt and slot connection to permit rotational movement of the conveyor pipe and adjustment of the hood in the line of feed, and at the other end connected to the pivoted lever by bolt and slot connection to permit bodily adjustment of the pipe and hood toward and from the cutter.

22. In a machine for shearing woolskins and the like, the combination with a pair of spaced shearing cutters for shearing the skin in separated narrow zones, of a supporting roll for supporting the skin adjacent the cutters, the roll being of a width exceeding the width of the skin to permit all portions of the skin to be presented to the cutters by successively feeding the skin through the machine, cooperating feed and pressure rolls positioned beyond the cutters in the line of feed for feeding the skin past the cutters, the width of the feeding and pressure rolls being somewhat greater than the total width of operation of the cutters and the intermediate spaced zone, and very much less than the width of the supporting roll, and means for actuating the cutters and the feed roll.

23. In a shearing machine, the combination with a shearing device, of feeding mechanism for feeding the skin to be sheared past the shearing device, and control means for throwing said device and mechanism into and out of operation, said control means including a treadle, connections from the treadle to the shearing device, and a spring-loaded, lost-motion connection between the treadle and the feeding mechanism constructed and arranged, when the treadle is depressed by the operator, to throw the shearing device out of operation before the feeding mechanism, and when the treadle is released, to throw the feeding mechanism into operation before the shearing device.

24. In a shearing machine, the combination with a shearing device, of feeding mechanism for feeding the skin to be sheared past the shearing device, and control means for throwing said device and mechanism into and out of operation, said control means including a shaft, a sprocket loosely mounted thereon and having a pin extending laterally therefrom, a disk fixed upon the shaft adjacent the sprocket and having an arcuate slot to receive the pin, a tension spring with one end attached to the sprocket and the other end connected with the shaft and tending to turn the sprocket upon the shaft to bring the pin in to one end of the slot, a treadle connection including a sprocket chain from the sprocket to the treadle and the shearing device for throwing said devices into and out of operation, and connections from the shaft to the feeding mechanism for throwing the feeding mechanism into and out of operation, all constructed and arranged, when the treadle is depressed by the operator, to throw the shearing device out of operation before the feeding mechanism, and when the treadle is released, to throw the feeding mechanism into operation before the shearing device.

25. In a shearing machine, the combination with a cutter and means for actuating the same, of a skin supporting roll over which the skin to be sheared is fed to the cutter, the roll being of small diameter to flex the skin sharply adjacent the cutter, and a suction hood to lift and straighten the fur adjacent the cutter, the cutter being positioned outside the hood and in advance of the same with respect to the movement of the skin, thereby avoiding interference by the hood with the operator's clear view of the skin as it is advanced to the cutter.

26. In a shearing machine, the combination with a suction hood of a cutter and means for actuating the same, means for feeding the skin past the cutter and means for adjustably supporting the hood with respect to the cutter and adjacent the same, the cutter being outside of the hood and in advance of the same with respect to the movement of the skin, thereby avoiding interference by the hood with the operator's clear view of the skin as it is advanced to the cutter.

27. In a shearing machine, the combination with a cutter having a shearing blade movable transversely of the direction of feed of the skin, of means for actuating the blade, a skin supporting roll over which the skin is fed to the cutter, the roll being of small diameter to flex the skin sharply adjacent the cutter, and a suction hood to lift and straighten the fur adjacent the cutter, the cutter being positioned outside the hood and in advance of the same with respect to the movement of the skin, thereby avoiding interference by the hood with the operator's clear view of the work as it is being advanced to the cutter.

28. A shearing machine for shearing the fur of pelts having, in combination, a shearing device disposed in the forward portion of the machine in position to provide the operator with a free and unobstructed view of the shearing operation, means to engage the pelt as it advances to the shearing device, all of such pelt engaging means being positioned entirely below the level of the shearing device and beneath the advancing pelt and engaging the flesh side of the same for supporting and presenting the pelt to the shearing device, and positively driven feeding devices supplementary to and distinct from said pelt engaging means positioned entirely beyond the point of operation of the shearing device for engaging the sheared pelt beyond such point.

ROGER L. GRIFFIN.
NORMAN Y. MOORE.